(12) United States Patent
Hitomi et al.

(10) Patent No.: US 9,706,110 B2
(45) Date of Patent: Jul. 11, 2017

(54) FOREIGN BODY INFORMATION DETECTION DEVICE AND FOREIGN BODY INFORMATION DETECTION METHOD OF IMAGING APPARATUS

(71) Applicant: Panasonic Intellectual Property Management Co., Ltd., Osaka (JP)

(72) Inventors: Hisakazu Hitomi, Osaka (JP); Yasuhiro Kuwahara, Osaka (JP); Hiromichi Ono, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/740,745

(22) Filed: Jun. 16, 2015

(65) Prior Publication Data

US 2015/0281571 A1    Oct. 1, 2015

Related U.S. Application Data

(63) Continuation of application No. PCT/JP2014/000780, filed on Feb. 17, 2014.

(30) Foreign Application Priority Data

Feb. 18, 2013 (JP) .................... 2013-028693

(51) Int. Cl.
- *H04N 5/217* (2011.01)
- *G06K 9/40* (2006.01)
- *H04N 5/232* (2006.01)
- *H04N 1/409* (2006.01)
- *G06T 7/00* (2017.01)

(52) U.S. Cl.
CPC .......... *H04N 5/23222* (2013.01); *G06K 9/40* (2013.01); *G06T 7/0002* (2013.01);
(Continued)

(58) Field of Classification Search
CPC ........ G06K 9/40; H04N 1/409; H04N 1/4097; H04N 5/2171
(Continued)

(56) References Cited

U.S. PATENT DOCUMENTS

| | | | | |
|---|---|---|---|---|
| 7,580,069 B2 * | 8/2009 | Hoshuyama | ....... | H04N 1/32128 348/231.99 |
| 7,893,984 B2 * | 2/2011 | Ikeda | ..................... | G03B 13/18 250/559.45 |

(Continued)

FOREIGN PATENT DOCUMENTS

| | | |
|---|---|---|
| JP | 2004-343519 A | 12/2004 |
| JP | 3863723 B2 | 12/2006 |

(Continued)

OTHER PUBLICATIONS

International Search Report issued in PCT/JP2014/000780, dated Mar. 11, 2014, with English translation.

*Primary Examiner* — Ngoc-Yen Vu

(74) *Attorney, Agent, or Firm* — McDermott Will & Emery LLP

(57) ABSTRACT

The present technology includes: a recording unit that records a plurality of image data to be displayed, the plurality of image data imaged and obtained by the imaging apparatus; first image data for detecting foreign body information, the first image data acquired before imaging the plurality of image data to be displayed; second image data for detecting foreign body information, the second image data acquired after imaging the plurality of image data to be displayed; and a controller configured to read the plurality of image data to be displayed recorded in the recording unit, and to detect information relating to the foreign body from the plurality of image data.

7 Claims, 7 Drawing Sheets

| | | | | Image number | | | | | | |
|---|---|---|---|---|---|---|---|---|---|---|
| | | | 001 | 002 | 003 | 004 | 005 | ----- n-1 | n | ----- 100 |
| Foreign body information | Foreign body a | D1 | 1 | 1 | 1 | 1 | 1 | ----- 1 | 0 | ----- 0 |
| | Foreign body b | C | 1 | 1 | 1 | 1 | 1 | ----- 1 | 1 | ----- 1 |
| | Foreign body c | C | 1 | 1 | 1 | 1 | 1 | ----- 1 | 1 | ----- 1 |
| | Foreign body d | D2 | 0 | 0 | 0 | 0 | 0 | ----- 0 | 1 | ----- 1 |

(52) U.S. Cl.
CPC ......... *H04N 1/4097* (2013.01); *H04N 5/2171* (2013.01); *H04N 5/23293* (2013.01); *G06T 2207/10004* (2013.01); *G06T 2207/10016* (2013.01); *G06T 2207/20212* (2013.01); *G06T 2207/30168* (2013.01); *H04N 5/23287* (2013.01)

(58) Field of Classification Search
USPC .......................................... 348/241; 382/254
See application file for complete search history.

(56) References Cited

U.S. PATENT DOCUMENTS

| | | | |
|---|---|---|---|
| 8,244,057 B2* | 8/2012 | Lin ........................ | G06T 5/005 382/275 |
| 8,879,869 B2* | 11/2014 | Zamfir .................. | H04N 5/217 382/173 |
| 2005/0001910 A1 | 1/2005 | Hoshuyama et al. | |
| 2006/0115177 A1 | 6/2006 | Ishiga | |
| 2010/0092103 A1 | 4/2010 | Ishiga | |
| 2012/0013772 A1 | 1/2012 | Ishiga | |
| 2016/0105591 A1* | 4/2016 | Theis ..................... | G06T 5/005 382/275 |

FOREIGN PATENT DOCUMENTS

| | | | | |
|---|---|---|---|---|
| JP | 2009-152696 A | 7/2009 | | |
| JP | 4419479 B2 | 2/2010 | | |
| JP | 4466015 B2 | 5/2010 | | |
| JP | 2012-222509 A | 11/2012 | | |
| JP | 2012213075 A | * 11/2012 | ............. | H04N 5/225 |

\* cited by examiner

FIG. 6

| Foreign body information | | 001 | 002 | 003 | 004 | 005 | ..... | n-1 | n | ..... | 100 |
|---|---|---|---|---|---|---|---|---|---|---|---|
| Foreign body a | D1 | 1 | 1 | 1 | 1 | 1 | ..... | 1 | 0 | ..... | 0 |
| Foreign body b | C | 1 | 1 | 1 | 1 | 1 | ..... | 1 | 1 | ..... | 1 |
| Foreign body c | C | 1 | 1 | 1 | 1 | 1 | ..... | 1 | 1 | ..... | 1 |
| Foreign body d | D2 | 0 | 0 | 0 | 0 | 0 | ..... | 0 | 1 | ..... | 1 |

Image number

FOREIGN BODY INFORMATION DETECTION DEVICE AND FOREIGN BODY INFORMATION DETECTION METHOD OF IMAGING APPARATUS

RELATED APPLICATIONS

This application is a continuation of International Application No. PCT/JP2014/000780, filed on Feb. 17, 2014, which in turn claims the benefit of Japanese Application No. 2013-028693, filed on Feb. 18, 2013, the disclosures of which Applications are incorporated by reference herein.

BACKGROUND

1. Field

The present technology relates to a foreign body information detection device and a foreign body information detection method for detecting foreign body information which is present in image data, in an imaging apparatus.

2. Description of Related Art

In an imaging apparatus, when foreign bodies such as dust are attached to an optical system, shadows of the foreign bodies are included in an imaged image, thereby causing a problem that quality of the image is deteriorated.

Unexamined Japanese Patent Publication No. 2009-152696 discloses an imaging apparatus that corrects a deterioration of image quality, which is caused by such extremely small foreign bodies that cannot be removed even by vibrations. Here, the extremely small foreign bodies are present in the optical system. The apparatus disclosed in Unexamined Japanese Patent Publication No. 2009-152696 images two images which are imaged so that diaphragm values therefor can be set different from each other, detects foreign body information (information regarding a position and size of each of the foreign bodies) from the imaged images which are imaged so that the diaphragm values can be different from each other, and records the foreign body information in association with data of the imaged image.

SUMMARY

A foreign body information detection device of an imaging apparatus according to the present technology includes: a recording unit that records a plurality of image data to be displayed, the plurality of image data imaged and obtained by the imaging apparatus; first image data for detecting foreign body information, the first image data acquired before imaging the plurality of image data to be displayed; second image data for detecting foreign body information, the second image data acquired after imaging the plurality of image data to be displayed; and a controller configured to read the plurality of image data to be displayed recorded in the recording unit, and to detect information relating to the foreign body from the plurality of image data. The controller is configured to detect the foreign body information for each of the foreign bodies based on the first image data and the second image data, the foreign body information indicating a position of each of the foreign bodies in the first image data and the second image data. The controller is configured to detect, by using the foreign body information detected in the first image data and the second image data, the foreign body information indicating each position of the foreign body in each of the plurality of image data to be displayed.

BRIEF DESCRIPTION OF DRAWINGS

FIG. 6 is an explanatory view showing an example of a foreign body information list created by the controller.

DETAILED DESCRIPTION

Figure 1:
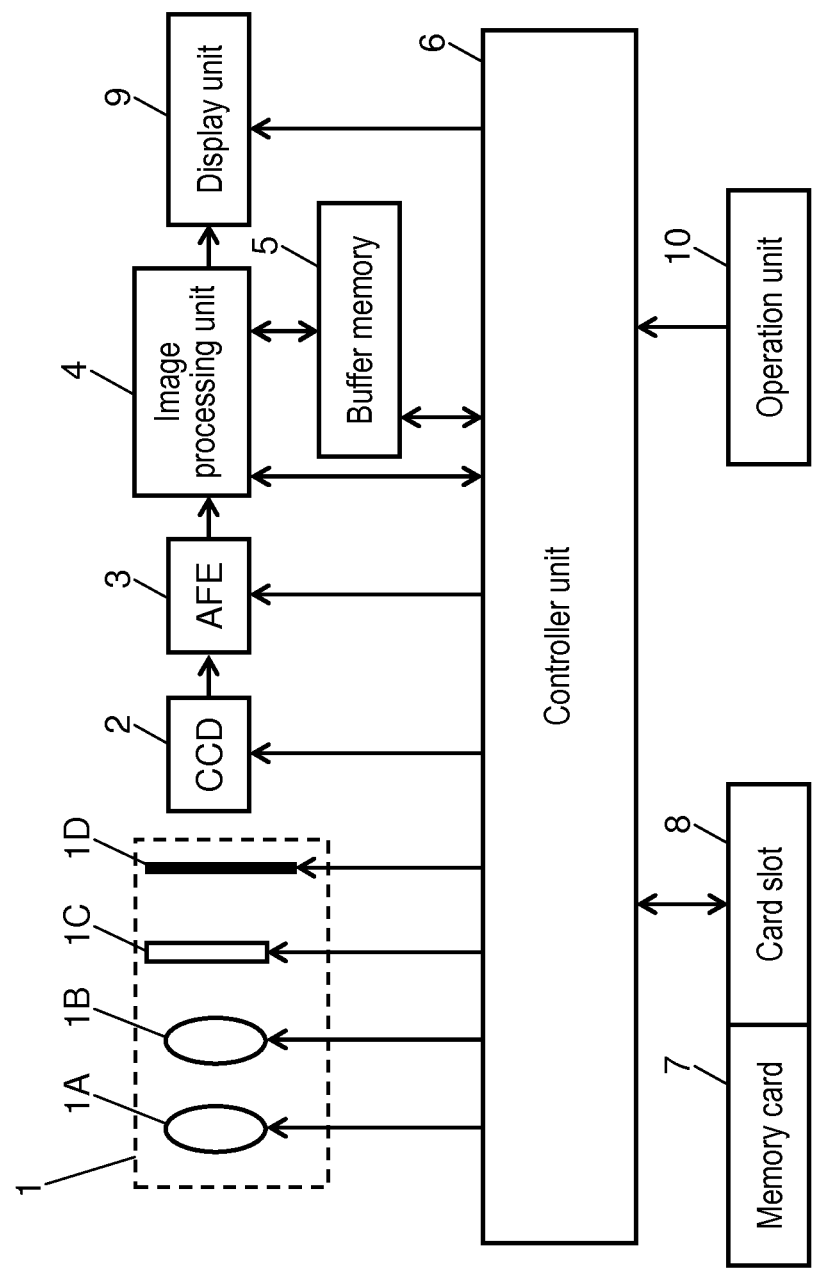
FIG. 1 is a block diagram showing an example of an overall configuration of an imaging apparatus in which a foreign body information detection device according to the present technology is used.

A description is made below of a foreign body information detection device and a foreign body information detection method according to an exemplary embodiment of the present technology while referring to the drawings. However, a description that is more detailed than necessary is omitted in some case. For example, a detailed description of an already well-known item and a duplicate description of substantially the same configurations are omitted in some case. This is for avoiding unnecessary redundancy of the following description and facilitating the understanding of those skilled in the art. Note that the inventor of the present technology provides the accompanying drawings and the following description in order to allow those skilled in the art to fully understand the present disclosure, and does not intend to limit the main theme described in the scope of claims.

[1-1. Configuration]

FIG. 1 is a block diagram showing an example of an overall configuration of an imaging apparatus in which a foreign body information detection device according to the present technology is used.

As shown in FIG. 1, the imaging apparatus images a subject image, which is formed through optical system 1, by image sensor 2 such as a CCD (Charge Coupled Devices) sensor and a CMOS (Complementary Metal-Oxide Semiconductor) sensor, which is an imaging unit. Image sensor 2 creates image data based on the imaged subject image. The image data created by image sensor 2 is sent to image processing unit 4, which performs processing such as image conversion, through AFE (Analog Front End) 3 as a signal conditioning circuit that conditions an analog signal. Image processing unit 4 performs various types of image processing for the image data thus sent. The created image data is recorded in a recording medium that is a data recording unit. Note that a flash memory, a memory card and the like are mentioned as examples of the recording medium, and the description of this exemplary embodiment is made while exemplifying a case where the recording medium is the memory card.

Image sensor 2 images the subject image formed through optical system 1, and creates the image data. When a digital camera is in an imaging mode, image sensor 2 can create image data with a new frame every fixed time.

For the image data read out from image sensor 2, AFE 3 performs amplification to an input range width of an A/D converter by an analog gain controller and A/D conversion by the A/D converter. Thereafter, AFE 3 outputs the image data to image processing unit 4.

Image processing unit 4 performs the various types of image processing for the image data outputted from AFE 3. The various types of image processing include smear correction, white balance correction, gamma correction, YC conversion processing, electron zoom processing, compression processing, expansion processing and the like. Note that the image processing is not limited to these. Image processing unit 4 temporarily stores image information, which is thus subjected to the various types of image processing, in buffer memory 5. Note that buffer memory 5 is storage means that functions as a work memory for image processing unit 4 and controller unit 6, and buffer memory 5 can be realized by a DRAM (Dynamic Random Access Memory) and the like.

Controller unit 6 is a unit that controls operations of the entire imaging apparatus. Controller unit 6 is composed of: a ROM (Read Only Memory) that stores programs; a CPU (Central Processing Unit) that processes various types of information by executing the programs; and the like. The ROM stores such programs for integrating and controlling the operations of the entire imaging apparatus, the programs including file control, auto focus control (AF control), auto exposure control (AE control), light emission control of a flash, and the like.

Memory card 7 in which the image data is recorded is attachable/detachable by a user to/from card slot 8 connected to controller unit 6, whereby memory card 7 is electrically and mechanically connected to controller unit 6. Note that card slot 8 may have a configuration including a function to control memory card 7. Memory card 7 is an external memory including a recording unit such as a flash memory in an inside thereof. Memory card 7 records data such as the image data processed in image processing unit 4. After the imaging apparatus receives an operation of a release button, which is performed by the user, the image data, which has a high pixel density and is recoded in memory card 7, is created by image processing unit 4 based on the image data created by image sensor 2. In memory card 7, controller unit 6 records the image data that is stored in buffer memory 5 after being processed in image processing unit 4. Moreover, the image data recorded in memory card 7 is displayed on display unit 9 such as a liquid crystal monitor based on an operation by the user.

Display unit 9 displays an image based on the image data processed in image processing unit 4.

Moreover, operation unit 10 connected to controller unit 6 is a general term of operation buttons and switches of the imaging apparatus and of a touch panel placed on display unit 9. Operation unit 10 is a unit that receives operations by the user. Upon receiving the operations by the user, operation unit 10 sends signals, which instruct a variety of operations, to controller unit 6.

Furthermore, optical system 1 is composed of: focus lens 1A; zoom lens 1B; diaphragm 1C; shutter 1D; and the like. Focus lens 1a is used for adjusting a focus state of a subject. Zoom lens 1B is used for adjusting an angle of view of the subject. Diaphragm 1C is used for adjusting a quantity of light made incident onto image sensor 2. Shutter 1D adjusts an exposure time of the light made incident onto image sensor 2. Focus lens 1A, zoom lens 1B, diaphragm 1C and shutter 1D are driven by drive means such as a DC motor and a stepping motor, which individually correspond thereto, in accordance with a control signal sent from controller unit 6. Note that, though not shown, optical system 1 may include an OIS (Optical Image Stabilizer) lens. Moreover, a variety of the lenses which compose optical system 1 can be composed of a plurality of lenses or a plurality of lens groups. Furthermore, such an imaging unit, which is composed of optical system 1, image sensor 2 and the like, may be composed by using a camera module in which the lens, the CMOS image sensor, the AFE, a part of the image processing unit, and the like are integrated into a module.

Note that image processing unit 4 and controller unit 6 may be composed of a hard-wired electronic circuit, or may be composed of a microcomputer or the like, which uses a program. Moreover, image processing unit 4 and controller unit 6 may be composed of one semiconductor. Furthermore, it is not necessary that the ROM be provided in an inside of controller unit 6, and the ROM may be provided as an external memory on an outside of controller unit 6.

Figure 2:
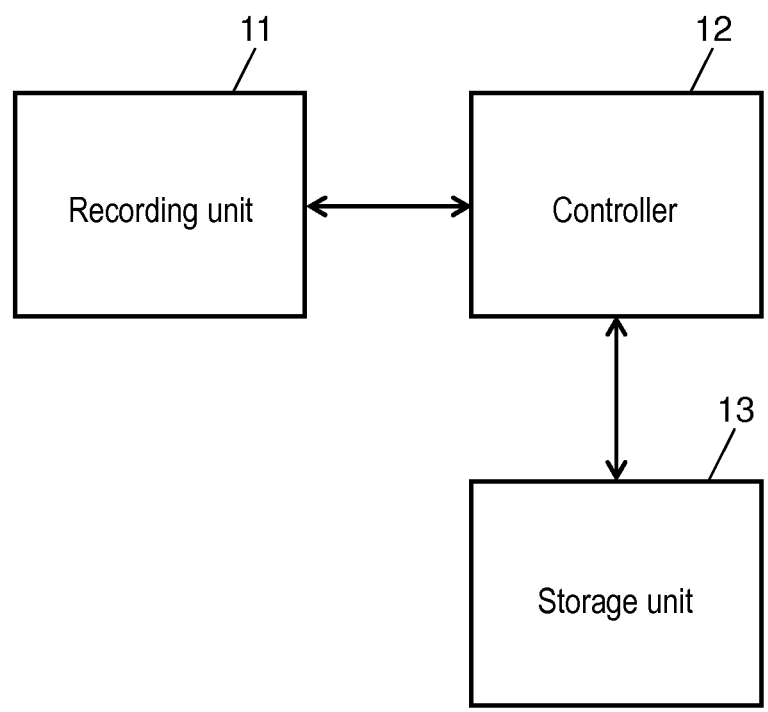
FIG. 2 is a block diagram showing a configuration of a foreign body information detection device in an exemplary embodiment of the present technology.

FIG. 2 is a block diagram showing a configuration of the foreign body information detection device in the exemplary embodiment of the present technology.

As shown in FIG. 2, the foreign body information detection device includes: recording unit 11 that records the image data; controller 12 for performing a detection operation for foreign body information; and storage unit 13 composed of a flash memory or the like, storage unit 13 storing a program for performing such a foreign body detection operation, and the like. This foreign body information detection device can be configured to be built in controller unit 6 of the imaging apparatus shown in FIG. 1. Note that the foreign body information detection device according to the present technology may be configured to be mounted on the imaging apparatus; however, it is not necessary that the foreign body information detection device be mounted on the imaging apparatus, and the foreign body information detection device may be provided as one function of an external image processing apparatus for processing the image data imaged by the imaging apparatus.

Recording unit 11 records first image data and second image data for detecting the foreign body information, and records a plurality of image data to be displayed. Here, the plurality of image data are those which the user images continuously. Recording unit 11 may be composed of memory card 7 shown in FIG. 1; however, is not limited to this as a matter of course. Any recording medium that can record the image data, the recording medium including an HDD (Hard Disk Drive), an SSD (Solid State Drive) and the like, may be used.

Here, the first image data is image data for detecting the foreign body, is the image data being imaged before the plurality of image data imaged continuously, and the second image data is image data for detecting the foreign body, the image data being imaged after the plurality of image data imaged continuously. The first image data and the second image data are image data obtained by imaging a background image composed of a single color such as white, blue and green. The first image data and the second image data are used for detecting the information of the foreign body, which is attached to the imaging apparatus, before and after continuously imaging the plurality of image data.

The information of the foreign body attached to the imaging apparatus refers to a foreign body such as dust attached to optical system 1 or imaging sensor 2 as the imaging unit in this imaging apparatus. Moreover, the foreign body information may be defects generated in optical system 1 and image sensor 2. The foreign body information is information by which the user recognizes that the foreign body is present in the image when the user visually recognizes the image data imaged by using the imaging apparatus. Hence, the first image data and the second image data are not limited to the image data obtained by imaging the background image composed of the single color, and just need to be image data from which it is easy to detect the foreign body information.

For example, in a case of detecting the information of the foreign body such as dust directly attached to image sensor 2, it is possible to obtain the first image data and the second image data by adjusting the diaphragm of optical system 1. That is to say, an image imaged by adjusting the diaphragm of optical system 1 becomes smooth by the fact that the background becomes blurred, and meanwhile, the foreign body such as dust attached to image sensor 2 is clearly imaged without being blurred, and the first image data and the second image data for detecting the foreign body information are obtained.

The image data to be displayed is the plurality of image data obtained in such a manner that the user images the subject continuously. The image data to be displayed is recorded in recording unit 11 in a state of being associated between the first image data and the second image data for detecting the foreign body information. The image data to be displayed may be recorded in recording unit 11 so that, if the plurality of image data obtained in such a manner that the user images such a specific subject is defined as one group of the image data, two or more groups of the image data to be displayed can be present between the first image data and the second image data, which are the same. For example, the foreign object information detection device may be configured so as to, at a time of starting the imaging, acquire the first image data for detecting the foreign body information and record the acquired first image data in recording unit 11, to thereafter acquire plural groups of the image data which are to be displayed, in such a manner that the user performs an imaging operation and record the acquired image data in recording unit 11, and to, at a time of ending the imaging, acquire the second image data for detecting the foreign body information and record the acquired second image data in recording unit 11. In short, the image data obtained in such a manner that the user images the subject, the image data being recorded in recording unit 11 in association between the first image data and the second image data for detecting the foreign body information, becomes the image data to be displayed.

Controller 12 has a function to read the image data recorded in recording unit 11, and to detect the foreign body information, which is related to the foreign body, for the image data. That is to say, controller 12 has at least following functions.

(1) A first detection function: to detect foreign body information, which indicates positions of the foreign bodies, for each of the foreign bodies based on the first image data and the second image data, the foreign bodies being present in the individual image data which are the first image data and the second image data.

(2) A second detection function: to detect foreign body information, which indicates a position of the foreign body in each of the plurality of image data which are to be displayed, by using at least one or more pieces of the foreign body information detected by the first detection function.

A description will be made later of specific operations of the first detection function and second detection function of this controller 12.

Storage unit 13 stores a program at least corresponding to the first detection function and the second detection function, which is owned by controller 12. Controller 12 reads the program stored in storage unit 13, and can thereby execute at least the first detection function and the second detection function.

[1-2. Operations]

Next, a description is made of operations of the foreign body information detection device and the foreign body information detection method according to the present technology while referring to FIG. 3 to FIG. 7.

Figure 3:
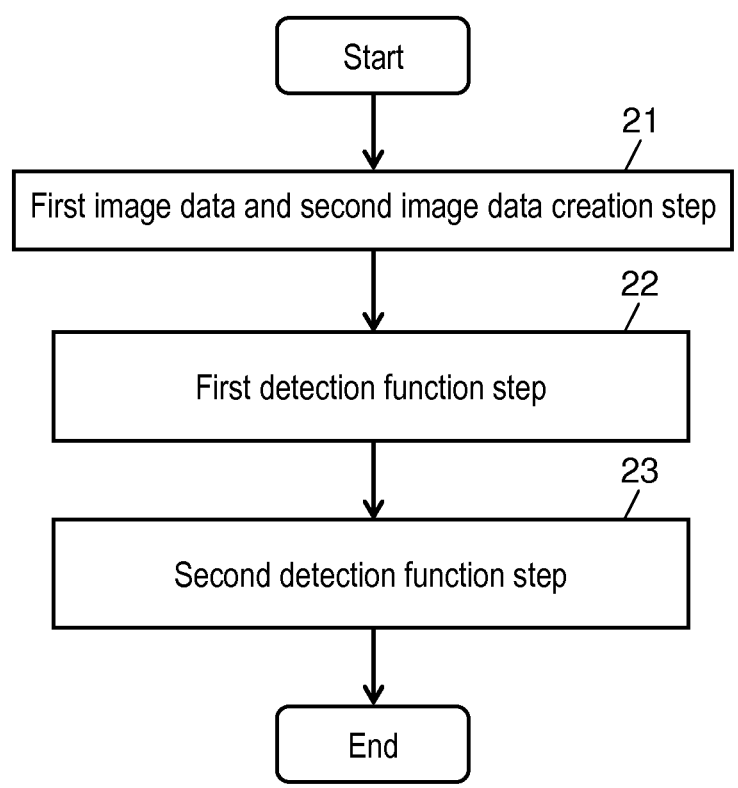
FIG. 3 is a flowchart for explaining a foreign body information detection operation of a controller in the foreign body information detection device and a foreign body information detection method according to the present technology.

FIG. 3 is a flowchart for explaining the foreign body information detection operation of the controller in the foreign body information detection device and the foreign body information detection method according to the present technology.

As shown in FIG. 3, in first image data and second image data creation step 21, the imaging apparatus images the background with a single color, for example, white paper or the like before and after imaging the plurality of image data to be displayed. In this way, image data of a uniform background composed of the single color is acquired. At this time, background image data with the single color, which is acquired before the imaging of the plurality of image data to be displayed, is defined to be the first image data. Meanwhile, background image data with the single color, which is acquired after the imaging of the plurality of image data to be displayed, is defined to be the second image data.

Next, controller 12 performs processing of first detection function step 22. In first detection function step 22, controller 12 acquires first foreign body information and second foreign body information as the pieces of foreign body information individually from the first image data and the second image data, which are described above. Each piece of the foreign body information is composed, for example, of image information including a position and a region. In some case, the foreign body information is composed of image information further including a shape and level information. Then, controller 12 creates a bundle, which is made of the first foreign body information and the second foreign body information, as the foreign body information.

Next, controller 12 performs processing of second detection function step 23. In second detection function step 23, controller 12 collates the foreign body information which is created in first detection function step 22, and the plurality of image data which are to be displayed, with each other, and thereby acquires the foreign body information for each of the images corresponding to the plurality of image data to be displayed.

Here, a description is made in detail of first detection function step 22 and second detection function step 23.

Figure 4:
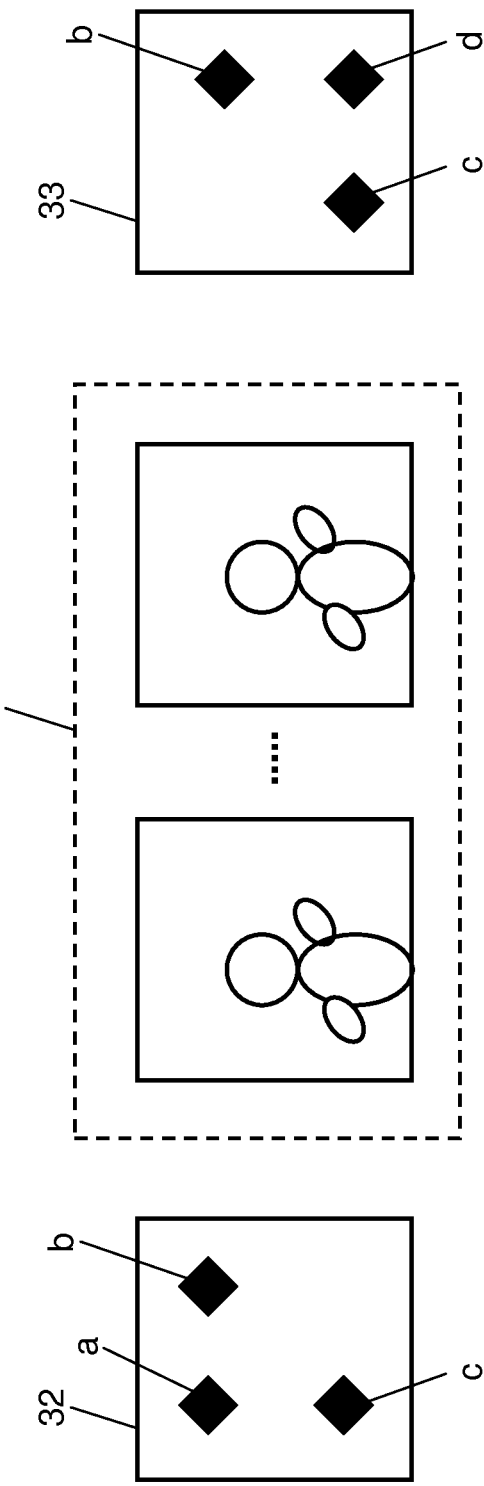
FIG. 4 is an explanatory view for explaining an outline of a first detection function step.

FIG. 4 is an explanatory view for explaining an outline of the first detection function step. As mentioned above, in first image data and second image data creation step 21, the background or the like with the single color is imaged before and after imaging the plurality of image data to be displayed, whereby image data of the background, which is composed of the single color, is obtained. FIG. 4 shows a state where first image data 32 and second image data 33, which are such background image data with the single color, are present, before and after plurality of image data 31 to be displayed. Here, the background image data are acquired before plurality of image data 31 are acquired.

As shown in FIG. 4, foreign body a, foreign body b and foreign body c, which are such as dust, are present in first image data 32. Moreover, foreign body b, foreign body c and foreign body d are present in second image data 33. Here, foreign body a is a foreign body proper to first image data 32. Moreover, foreign body b and foreign body c are foreign bodies common to first image data 32 and second image data 33. Furthermore, foreign body d is a foreign body proper to second image data 33. That is to say, foreign bodies b and c are common foreign bodies, and foreign bodies a and d are non-common foreign bodies.

Controller 12 acquires the first foreign body information from first image data 32, which is shown in FIG. 4, based on foreign body a, foreign body b and foreign body c. Moreover, controller 12 acquires the second foreign body information from second image data 33, which is shown in FIG. 4, based on foreign body b, foreign body c and foreign body d. Then, controller 12 creates foreign body information, which is based on foreign body a to foreign body d, from the first foreign body information and the second foreign body information. In this way, the first detection function step is executed.

Figure 5:
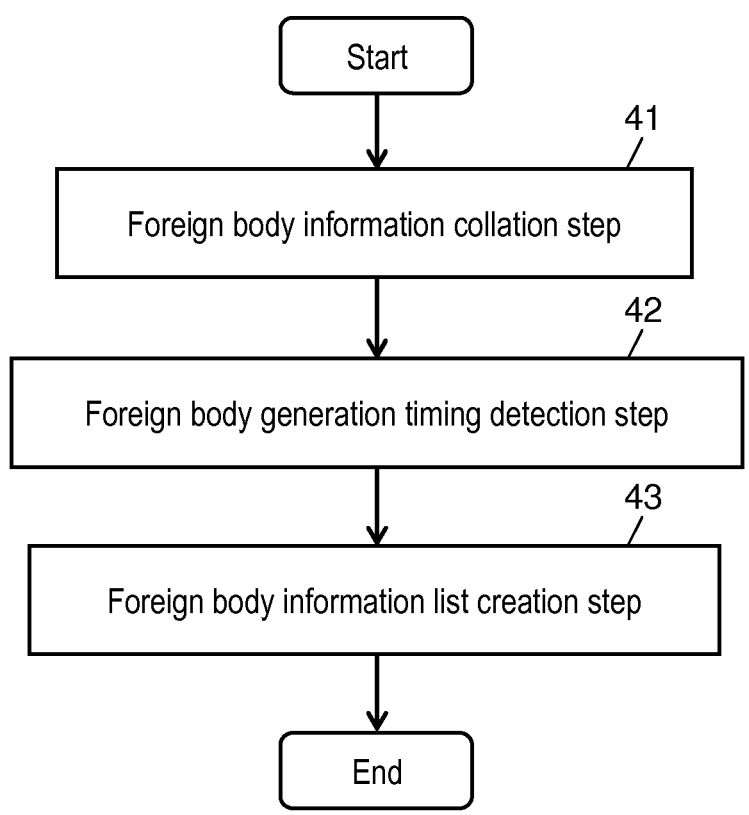
FIG. 5 is a flowchart for explaining a processing operation of a second detection function step.

FIG. 5 is a flowchart for explaining a processing operation of the second detection function step.

First, in foreign body information collation step 41, controller 12 integrates results of the first foreign body information and the second foreign body information, which are created in the first detection function step, with each other. Specifically, controller 12 collates the first foreign body information and the second foreign body information with each other, and obtains common foreign body information C, which is present commonly to the first foreign body information and the second foreign body information, non-common foreign body information D1 present only in the first foreign body information, and non-common foreign body information D2 present only in the second foreign body information. Controller 12 obtains foreign body information A formed by integrating these foreign body information C, foreign body information D1 and foreign body information D2 with one another. Moreover, this foreign body information includes coordinate values, which indicate position information of the foreign bodies, in the image data. For example, in FIG. 4, a coordinate of foreign body a becomes (x1, y1), a coordinate of foreign body b becomes (x2, y2), a coordinate of foreign body c becomes (x3, y3), and a coordinate of foreign body d becomes (x4, y4). At this time, foreign body b and foreign body c in the first foreign body information and foreign body b and foreign body c in the second foreign body information are processed to be integrated as foreign body information C, foreign body a is processed as foreign body information D1, and further, foreign body d is processed as foreign body information D2. That is to say, foreign body information A, which is obtained by integrating first foreign body information and second foreign body information with each other, includes: common foreign body information C formed by integrating foreign body b and foreign body c with each other; non-common foreign body information D1 made from foreign body a; and non-common foreign body information D2 made from foreign body d.

Next, in foreign body generation timing detection step 42, controller 12 collates non-common foreign body information D1 and foreign body information D2 and plurality of image data 31 which are to be displayed, with each other. In this way, controller 12 acquires an image number of image data in which the foreign body disappears or is generated. Here, the image number corresponds to an order in a case where the plurality of image data to be displayed are arrayed in an imaging order. For example, in a case of 100 pieces of the image data to be displayed, an image number of first image data to be displayed is [001], then the number is increased sequentially, and an image number of a last image data to be displayed becomes [100].

Specifically, foreign body information D1 is present only in the first foreign body information. Therefore, it is considered that the foreign body, which corresponds to foreign body information D1, has disappeared or removed during a period while image data 31 to be displayed is being imaged. Accordingly, controller 12 detects a change of the foreign body, which is shown by foreign body information D1, sequentially from image number [001] in a descending manner. In a case of having detected the disappearance or movement of the foreign body, which is shown by foreign body information D1, at image number [n], controller 12 determines that, for image numbers up to image number [n−1], the foreign body corresponding to foreign body information D1 is added to the image data. Meanwhile, for image numbers on and after image number [n], controller 12 determines that the foreign body corresponding to foreign body information D1 is not added to the image data.

Moreover, foreign body information D2 is present only in the second foreign body information. Therefore, it is considered that the foreign body, which corresponds to foreign body information D2, is newly generated during a period while image data 31 to be displayed is being imaged. Accordingly, controller 12 detects the change of the foreign body, which is shown by foreign body information D2, sequentially from that with a last image number in an ascending manner. In a case of having detected the new generation of the foreign body, which is shown by foreign body information D2, at image number [n], controller 12 determines that, for image numbers up to image number [n+1], the foreign body, which is shown by foreign body information D2, is added to the image data. Meanwhile, for image numbers on and before image number [n], controller 12 determines that the foreign body corresponding to foreign body information D2 is not added to the image data.

As described above, in a case of detecting respective pieces of timing when foreign bodies a and d, which are non-common to first image data 32 and second image data 33, are generated in the plurality of image data 31 which are to be displayed, in foreign body generation timing detection step 42, then controller 12 first detects whether or not the non-common foreign body information is present in the imaging order of the plurality of image data 31 to be displayed. Then, controller 12 is configured to detect the change of image data 31, in which image data 31 is changed from a state where non-common foreign body a is present to a non-present state where non-common foreign body a is not present, or from a state where non-common foreign body d is not present to a state where non-common foreign body d is present, and to determine that, for image data 31 after the state of the foreign body is changed, conditions for the presence thereof after the change are continued.

Note that controller 12 is configured to determine that foreign body information C is present commonly to first foreign body information and second foreign body information is present individually in plurality of image data 31 to be displayed.

Next, in foreign body information list creation step 43, controller 12 creates a foreign body information list, which corresponds to the respective pixel numbers of the image data to be displayed, based on a result of making the determination in previous foreign body generation timing detection step 42 and based on information about the numbers of images in which foreign body information C, foreign body information D1 and foreign body information D2 are present. This foreign body information list provides information indicating the presence of the foreign body and the position of the foreign body in each of the plurality of image data to be displayed.

FIG. 6 is an explanatory view showing an example of the foreign body information list created by controller 12. In foreign body information list creation step 43, controller 12 creates the foreign body information list as table information which is as shown in FIG. 6, based on the first image data, the second image data and the image data to be displayed.

The table shown in FIG. 6 is an example of the list showing the presence of the foreign body in the image data to be displayed. Specifically, the table includes information regarding as to whether or not foreign bodies a, b, c and d are present in image numbers [001] to [100]. That is to say, whether or not each of foreign bodies a to d is present is described as a value of [0] or [1] for each of the image numbers of the image data to be displayed. In the table information of FIG. 6, for each of foreign bodies a to d, [0] indicates that any of foreign bodies a to d is not present, and [1] indicates that any of foreign bodies a to d is present. Foreign bodies a to d also include the position information of the foreign bodies in the image data, and accordingly, the table information shown in FIG. 6 becomes information indicating the presence of the foreign body and the position of the foreign body for each of the plurality of image data to be displayed.

As described above, the foreign body information detection device according to the present technology includes: recording unit 11 that records plurality of image data 31 which are to be displayed and are obtained by imaging the subject by the imaging apparatus, first image data 32 for detecting the foreign body information, first image data 32 being acquired before imaging plurality of image data 31 to be displayed, and second image data 33 for detecting the foreign body information, second image data 33 being acquired after imaging plurality of image data 31 to be displayed; and controller 12 configured to read the plurality of image data which are to be displayed and are recorded in recording unit 11, and to detect the information regarding the foreign body for the image data. Controller 12 is configured to detect the foreign body information which indicates the position of each of the foreign bodies present in the individual image data as first image data 32 and second image data 33, for each of the foreign bodies based on first image data 32 and second image data 33, and to detect foreign body information which indicates the position of the foreign body in each of plurality of image data 31 which are to be displayed, by using the detected foreign body information.

Moreover, the foreign body information detection method according to the present technology includes: first image data and second image data creation step 21 of acquiring first image data 32 and second image data 33 before and after imaging plurality of image data 31 which are to be displayed and are obtained by imaging the subject by the imaging apparatus, each of first image data 32 and second image data 33 being for detecting the foreign body information; first detection function step 22 of acquiring the first foreign body information and the second foreign body information as the foreign body information individually from first image data 32 and second image data 33; and second detection function step 23 of collating the foreign body information which is created in first detection function step 22, and plurality of image data 31 which are to be displayed, with each other, and thereby acquiring the foreign body information indicating the position of the foreign body for each of the images, each of the images corresponding to each of the plurality of image data to be displayed. Second detection function step 23 includes the foreign body information collation step of collating the first foreign body information and the second foreign body information, which are created in first detection function step 22, with each other, and obtaining the common foreign body information present commonly to the first foreign body information and the second foreign body information, the non-common foreign body information present only in the first foreign body information, and the non-common foreign body information present only in the second foreign body information.

In this way, the foreign body information detection device and the foreign body information detection method according to the present technology can specify the information regarding the foreign body in plurality of image data 31 to be displayed, and moreover, can eliminate a necessity to perform an operation of strictly detecting the foreign body for each of plurality of image data 31, can predictively detect the foreign body information based on the foreign body information detected by first image data 32 and second image data 33, and can strike a balance between accuracy enhancement of the foreign body detection operation and reduction of data throughput.

Moreover, in the foreign body information detection device and the foreign body information detection method according to the present technology, there is additionally provided a notification unit which issues a notice that the foreign body such as dust enters the optical system or imaging unit of the imaging apparatus based on the result of detecting the foreign body information in each of the plurality of image data to be displayed, whereby the user who uses the imaging apparatus does not acquire an incorrect image on which the foreign body is imaged, and can always acquire an accurate image. Specifically, a notification unit controlled by controller 12 of the foreign body information detection device according to the present technology is provided, and based on the detection result by the foreign body information detection device and the foreign body information detection method, the notification unit issues a notice that the foreign body such as dust enters the imaging apparatus, and prompts the user to clean the optical system and imaging unit of the imaging apparatus, whereby the accurate image can always be imaged by the imaging apparatus. In this way, in a medical imaging apparatus, there is obtained an effect that an incorrect diagnosis, which may be caused by obtaining the incorrect image, can be reduced. In particular, in accordance with the present technology, the foreign body detection operation can be performed with high accuracy, and in addition, the detection of the foreign body information can be detected rapidly since the data throughput is small, and accordingly, the user who uses the imaging apparatus can easily perform maintenance of the imaging apparatus.

Next, a description is made of the foreign body detection operation in controller 12.

Figure 7:
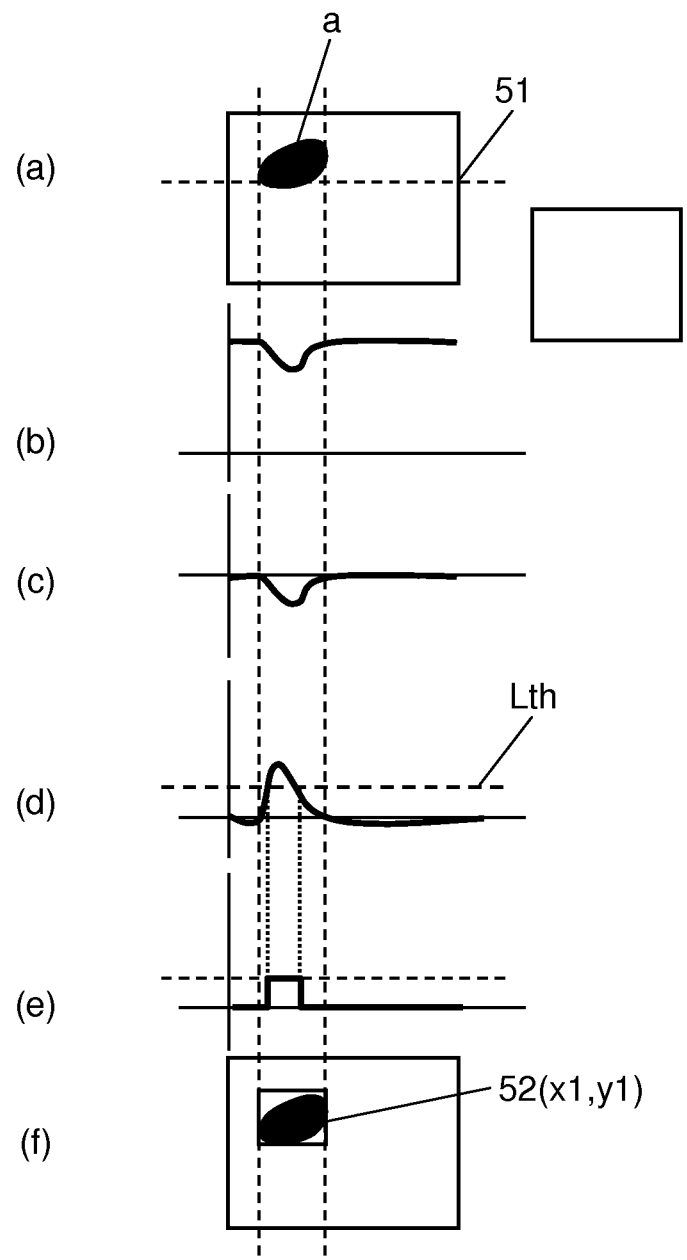
FIG. 7 is an explanatory view for explaining an example of a foreign body detection operation in the controller in the foreign body information detection device according to the present technology.

FIG. 7 is an explanatory view for explaining an example of the foreign body detection operation in the controller in the foreign body information detection device according to the present technology. FIG. 7 shows an example of a case of detecting foreign body a which is located on an upper left of first image data 32 shown in FIG. 4, based on the information of the position, the region, the shape and the level. Note that, in part (a) of FIG. 7, a whole of a portion corresponding to foreign body a is shown uniformly black for convenience of drawing the illustration; however, in actual, a vicinity of a center of the foreign body is more black, and a peripheral portion thereof gradually gets closer to a level of the background.

Controller 12 calculates a brightness level of the image on straight line 51 shown by a dotted line of part (a) of FIG. 7. Part (b) of FIG. 7 is a view showing a state of the calculated brightness level. The brightness level is lowered in the vicinity of the center of foreign body a in accordance with the actual circumstances.

Part (c) of FIG. 7 is a view in which, in the brightness level shown in part (b) of FIG. 7, only a variable component by foreign body a is extracted. Controller 12 performs processing for detecting a brightness level of such a periphery of foreign body a and subtracting the brightness level of the periphery of foreign body a, and thereby extracts only the variable component by foreign body a as shown in part (c) of FIG. 7. For example, a method of obtaining the level of the periphery of foreign body a can be performed in such a manner that a signal component thus detected is passed through a low-pass filter, and that a portion, in which the data level of foreign body a protrudes, is smoothened.

Next, as shown in part (d) of FIG. 7, the signal component changed in a negative direction is inverted, and the inverted signal component is defined as a signal of the foreign body level. Here, controller 12 performs binarization for such a signal at the foreign body level by using a threshold value Lth at a fixed level. A case where the foreign body level is larger than threshold value Lth is defined as [1], and a case where the foreign body level is smaller than threshold value Lth is defined as [0]. Part (e) of FIG. 7 is a view showing information of the foreign body signal thus binarized.

Part (f) of FIG. 7 is an explanatory view for explaining a method for detecting the shape of the foreign body, the position of the foreign body and the range of the foreign body. As shown in part (f) of FIG. 7, the image of the foreign body is two-dimensional information, and this two-dimensional binarization information is defined as the shape of the foreign body. In part (f) in FIG. 7, a black portion indicates the shape of the foreign body, in which a portion of which binarized level of the foreign body is [1] is shown by a portion of the black color. Range 52 of the foreign body is a rectangular frame that surrounds the whole of the foreign body as the portion of the black color. Range 52 of the foreign body is obtained by calculating a minimum value and a maximum value in each of the horizontal direction and the vertical direction. Moreover, the position of the foreign body indicates position information for a certain foreign body. For example, an upper left point of range 52 of the foreign body, a center of range 52 of the foreign body, a gravitational center of the shape of the foreign body, or the like is defined as the position information of the foreign body. In the example of part (f) of FIG. 7, the position of foreign body a is represented as a coordinate (x1, y1).

By the method described above, controller 12 can detect the information about the position of the foreign body, the range of the foreign body, the shape of the foreign body and the level of the foreign body. Then, controller 12 acquires the first foreign body information from the first image data, in addition, acquires the second foreign body information from the second image data, and collates the first foreign body information and the second foreign body information, which are thus acquired, with each other, and thereby becomes capable of determining whether the foreign body, which is included in the first foreign body information or the second foreign body information, is the foreign body common to the first foreign body information and the second foreign body information, or the foreign body present only in the first foreign body information, or the foreign body present only in the second foreign body information.

Here, with regard to a case where controller 12 makes a determination that the foreign bodies are the common foreign body based on the first foreign body information and the second foreign body information, controller 12 is capable of making this determination, for example, at a time of determining that the positions of the foreign bodies included in the first foreign body information and the second foreign body information are close to each other by using the position information of each foreign body. Moreover, it is also possible to use a method for determining that the foreign bodies are the common foreign body when it is determined that, when a horizontal width and a vertical width in the rectangular frame indicating range 52 of the foreign body included in each of the first foreign body information and the second foreign body information are Δx and Δy, respectively, values of Δx and Δy are approximate to those of the other. Furthermore, it is also possible to use a method for determining that the foreign bodies are the common foreign body when it is determined that the shapes of the foreign bodies are similar to each other. Still further, it is also possible to use a method for determining that the foreign bodies are the common foreign body by using the levels of the foreign bodies in addition to the shapes of the foreign bodies. Each of the methods may be used singly by being selected from among such a plurality of determination methods. However, as a matter of course, the plurality of determination methods may be used in combination, whereby it is possible to make the determination with higher accuracy.

Note that, in a case of detecting the foreign body for the plurality of image data which are to be displayed, by the processing of the second detection function, the foreign body may be detected by using a processing method similar to that of the processing performed by the first detection function. However, if the operation of detecting the foreign body is performed for the whole of the image data as in the first detection function, then steps and an amount of information, which are to be processed, are increased. Hence, in the processing method of the second detection function, only image data on the periphery of the foreign body detected by the first detection function may be processed.

[1-3. Effects and the Like]

As described above, the foreign body information detection device and the foreign body information detection method include: recording unit 11 that records plurality of image data 31 which are to be displayed and are obtained by imaging the subject by the imaging apparatus, first image data 32 which has the single-color background and is acquired before imaging plurality of image data 31 to be displayed, and second image data 33 which has the single-color background and is acquired after imaging plurality of image data 31 to be displayed; and controller 12 configured to read the plurality of image data which are to be displayed and are recorded in recording unit 11, and to detect the information regarding the foreign body for the image data. Controller 12 is configured to detect the foreign body information which indicates the position of each of the foreign bodies present in the individual image data as first image data 32 and second image data 33, for each of the foreign bodies based on first image data 32 and second image data 33, and to detect the foreign body information which indicates the position of the foreign body in each of plurality of image data 31 which are to be displayed, by using the detected foreign body information.

In this way, the information regarding the foreign bodies can be specified easily from first image data 32 and second image data 33. Moreover, the information regarding the foreign bodies in plurality of image data 31 which are to be displayed and are imaged between first image data 32 and second image data 33, can be thereafter specified. Therefore, it is not necessary for controller 12 to perform the operation of strictly detecting the foreign bodies for all pixels of each of the plurality of image data, and the foreign body information can be predictively detected based on the foreign body information detected in first image data 32 and second image data 33. In this way, the balance can be struck between the accuracy enhancement of the foreign body detection operation and the reduction of the data throughput in controller 12.

Moreover, in the foreign body information detection device and the foreign body information detection method according to the present technology, there is additionally provided the notification unit which issues a notice that the foreign body such as dust enters the optical system or imaging unit of the imaging apparatus based on the result of detecting the foreign body information in each of the plurality of image data to be displayed, whereby the user who uses the imaging apparatus can always acquire the accurate image.

As described above, the exemplary embodiment is described as exemplification of the present technology. For this description, the accompanying drawings and the detailed description are provided.

Hence, the constituent elements described in the detailed description with reference to the accompanying drawings can include not only constituent elements which are essential for solving the problems, but also constituent elements which are mentioned for exemplifying the above-described technology and are not essential for solving the problems. Therefore, it should not be immediately recognized that such inessential constituent elements are essential by the fact that the inessential constituent elements are described in the detailed description with reference to the accompanying drawings.

Moreover, the above-mentioned exemplary embodiment exemplifies the technology in this disclosure, and accordingly, can be subjected to various types of alterations, substitution, additions, omissions and the like within the scope of claims or equivalents thereof.

What is claimed is:

1. A foreign body information detection device of an imaging apparatus, comprising:
   a recording unit that records
      a plurality of image data to be displayed, the plurality of image data imaged and obtained by the imaging apparatus;
      first image data for detecting foreign body information, the first image data being imaged and obtained by the imaging apparatus before imaging the plurality of image data to be displayed;
      second image data for detecting foreign body information, the second image data being imaged and obtained by the imaging apparatus after imaging the plurality of image data to be displayed; and
   a controller configured to read the plurality of image data to be displayed recorded in the recording unit, and to detect information relating to the foreign body from the plurality of image data,
   wherein the controller is configured:
      to detect the foreign body information for each of the foreign bodies by comparing the first image data and the second image data, the foreign body information indicating a position of each of the foreign bodies in the first image data and the second image data;
      to detect, by using the foreign body information detected in the first image data and the second image data, the foreign body information indicating each position of the foreign body in each of the plurality of image data to be displayed;
      to acquire first foreign body information from the first image data, in addition, to acquire second foreign body information from the second data;
      to collate the acquired first foreign body information and the acquired second foreign body information with each other; and
      to obtain information indicating presence and position of the foreign body in each of the plurality of image data to be displayed, based on foreign body information present only in the first foreign body information or based on foreign body information present only in the second foreign body information in a case where the foreign body information present only in the first foreign body information or the foreign body information present only in the second foreign body information is obtained, and
   wherein the controller is further configured,
      in a case of detecting timing when foreign bodies non-common to the first image data and the second image data are generated in the plurality of image data to be displayed:
         to detect whether or not non-common foreign body information is present in the plurality of image data to be displayed;
         to detect a change of the image data in which the image data is changed from a state where a non-common foreign body is present to a non-present state where the non-common foreign body is not present, or from a state where the non-common foreign body is not present to a state where the non-common foreign body is present; and
         to make a determination that, with respect to the image data after the state of the foreign body is changed, conditions for presence of the image data after the change are continued.

2. The foreign body information detection device of an imaging apparatus according to claim 1,
   wherein the controller is further configured:
      to regard that a common foreign body present commonly to the first foreign body information and the second foreign body information is present in each of the plurality of image data to be displayed in a case where the common foreign body is obtained; and
      to obtain information indicating presence and position of the foreign body in each of the plurality of image data to be displayed.

3. The foreign body information detection device of an imaging apparatus according to claim 1, further comprising:
   a notification unit controlled by the controller,
   wherein the controller is configured to issue a notice that the foreign body enters an optical system or an imaging unit of the imaging apparatus based on a result of detecting the foreign body information.

4. A foreign body information detection device of an imaging apparatus, comprising:
   a recording unit that records
      a plurality of image data to be displayed, the plurality of image data imaged and obtained by the imaging apparatus;
      first image data for detecting foreign body information, the first image data being imaged and obtained by the imaging apparatus before imaging the plurality of image data to be displayed;

second image data for detecting foreign body information, the second image data being imaged and obtained by the imaging apparatus after imaging the plurality of image data to be displayed; and a controller configured to read the plurality of image data to be displayed recorded in the recording unit, and to detect information relating to the foreign body from the plurality of image data, wherein the controller is configured:
to detect the foreign body information for each of the foreign bodies based on by comparing the first image data and the second image data, the foreign body information indicating a position of each of the foreign bodies in the first image data and the second image data; and to detect, by using the foreign body information detected in the first image data and the second image data, the foreign body information indicating each position of the foreign body in each of the plurality of image data to be displayed, and wherein the controller is further configured,
in a case of making a determination that the foreign bodies are a common foreign body based on the first foreign body information and the second foreign body information:
to select a method for making the determination of the common foreign body from among methods below:
a method for determining that the foreign bodies are the common foreign body at a time of determining that the positions of the foreign bodies included in the first foreign body information and the second foreign body information are close to each other by using position information of each of the foreign bodies;
a method for determining that the foreign bodies are the common foreign body at a time of determining that, when a horizontal width and a vertical width in a rectangular frame indicating a range of the foreign body included in each of the first foreign body information and the second foreign body information are $\Delta x$ and $\Delta y$, respectively, values of $\Delta x$ and $\Delta y$ are approximate to each other;
a method for determining that the foreign bodies are the common foreign body when it is determined that shapes of the foreign bodies are similar to each other, and a method for determining that the foreign bodies are the common foreign body by using levels of the foreign bodies in addition to the shapes of the foreign bodies; and
to use the selected method singly or in combination.

5. The foreign body information detection device of an imaging apparatus according to claim 4,
wherein the controller is further configured:
to acquire first foreign body information from the first image data, in addition, to acquire second foreign body information from the second data;
to collate the acquired first foreign body information and the acquired second foreign body information with each other;
to regard that a common foreign body present commonly to the first foreign body information and the second foreign body information is present in each of the plurality of image data to be displayed in a case where the common foreign body is obtained; and
to obtain information indicating presence and position of the foreign body in each of the plurality of image data to be displayed.

6. The foreign body information detection device of an imaging apparatus according to claim 4, further comprising:
a notification unit controlled by the controller,
wherein the controller is configured to issue a notice that the foreign body enters an optical system or an imaging unit of the imaging apparatus based on a result of detecting the foreign body information.

7. A foreign body information detection method of an imaging apparatus, comprising:
a first image data and second image data creation step of acquiring first image data for detecting foreign body information and second image data for detecting foreign body information before and after imaging a plurality of image data to be displayed, the first and second image data and the plurality of image data being obtained by the imaging apparatus;
a first detection function step of acquiring first foreign body information and second foreign body information as the foreign body information by comparing the first image data and the second image data, respectively; and
a second detection function step of collating the foreign body information created in the first detection function step with the plurality of image data to be displayed for acquiring foreign body information indicating a position of the foreign body for each of images corresponding to each of the plurality of image data to be displayed, wherein:
the second detection function step includes a foreign body information collation step of collating the first foreign body information created in the first detection function step with the second foreign body information created in the first detection function step for obtaining common foreign body information present commonly to the first foreign body information and the second foreign body information, non-common foreign body information present only in the first foreign body information, and non-common foreign body information present only in the second foreign body information, and
in a case of detecting timing when foreign bodies non-common to the first image data and the second image data are generated in the plurality of image data to be displayed:
it is detected whether or not non-common foreign body information is present in the plurality of image data to be displayed;
a change of the image data in which the image data is changed from a state where a non-common foreign body is present to a non-present state where the non-common foreign body is not present, or from a state where the non-common foreign body is not present to a state where the non-common foreign body is present, is detected; and
a determination that, with respect to the image data after the state of the foreign body is changed, conditions for presence of the image data after the change are continued, is made.

* * * * *